United States Patent [19]

Frances et al.

[11] Patent Number: 4,940,751

[45] Date of Patent: Jul. 10, 1990

[54] WETTABLE SILICON ELASTOMER FOR THE MANUFACTURE OF CONTACT LENSES

[75] Inventors: Jean-Marc Frances, Vcilleurbanne; Georges Wajs, Ivry sur Seine, both of France

[73] Assignee: Essilor International (Compagnie Generale d'Optique), Creteil, France

[21] Appl. No.: 261,790

[22] Filed: Oct. 24, 1988

[30] Foreign Application Priority Data

Oct. 23, 1987 [FR] France ............................ 87 14681

[51] Int. Cl.$^5$ ........................................ C08G 180/00
[52] U.S. Cl. ............................ 525/54.2; 264/331.11; 264/340; 525/54.21; 525/54.24; 525/474; 525/478; 525/476
[58] Field of Search ................. 525/54.2, 54.24, 54.21, 525/474, 478, 476; 264/331.11, 340

[56] References Cited

U.S. PATENT DOCUMENTS

| | | | |
|---|---|---|---|
| 3,556,754 | 1/1971 | Marsden | 525/54.24 |
| 4,012,568 | 3/1977 | Dean et al. | 525/54.21 |
| 4,365,050 | 12/1982 | Ivani | 527/312 |
| 4,588,624 | 5/1986 | Nygren et al. | 428/36 |
| 4,673,584 | 6/1987 | Nygren et al. | 427/2 |
| 4,806,595 | 2/1989 | Noishiki et al. | 525/54.2 |

FOREIGN PATENT DOCUMENTS 2091750 8/1982 United Kingdom .

*Primary Examiner*—Melvyn I. Marquis
*Attorney, Agent, or Firm*—Felfe & Lynch

[57] ABSTRACT

The wettable silicone elastomer is obtained by crosslinking of a composition of epoxidized silicones. The elastomer thus obtained is made wettable by grafting saccharide compounds on epoxy groups of the elastomer.

The invention is applied in particular to the manufacture of contact lenses.

18 Claims, No Drawings

WETTABLE SILICON ELASTOMER FOR THE MANUFACTURE OF CONTACT LENSES

The invention on relates to the preparation and formation of material having good wettability and properties which make this material useful for manufacture of contact lenses.

Various materials obtained from organic compositions are proposed at the present time for the manufacture of contact lenses. Among these compositions, the invention is specially concerned with those having a base of silicone elastomers or in other words polymers of the organopolysiloxane type.

Silicone elastomers are in fact particularly advantageous materials for contact lenses, not only on account of their mechanical and optical properties but also by reason of their high permeability to oxygen which is sufficient to preserve the gaseous metabolism of the cornea without making it necessary to ensure that these polymers contain large quantities of water, as is the case with hydrogels having a base of hydroxyethyl methacrylate or similar compounds. It is therefore a known practice to make use of various polyorganosiloxane compositions which can be molded and hardened to form contact lenses.

On the other hand, the known polymers do not make it possible to produce articles of silicone elastomers which directly exhibit the necessary properties of wettability in the lacrimal medium.

Methods for making the silicone compositions readily hydrophilic without affecting their optical characteristics and their mechanical properties are in fact already known. They usually consist in modifying the surface properties of articles which result from shaping and hardening of such compositions in order to obtain a material which has the desired wettability.

In accordance with certain techniques, a surface treatment of this nature has the effect of forming a copolymer of silicone and polyvinyl-pyrrolidone. Worthy of note in this connection are Fr. Pat. No. 1,526,394 and U.S. Pat. No. 3,700,573 which relate to radiochemical grafting of vinyl-pyrrolidone on silicone elastomers, and U.S. Pat. No. 4,229,273 in which the same grafting process is performed by exposure to non-ionizing ultraviolet radiation. However, clinical experimentation on contact lenses of silicone/polyvinyl-pyrrolidone copolymers as obtained in accordance with these patents exhibits rapid fouling by deposition of lipids and proteins which are absorbed at the surface of the lens material, with the result that these lenses suffer from a loss of wettability.

Other patents including Fr. Pat. No. 2,111,959, U.S. Pat. No. 4,055,378, Fr. Pat. No. 2,166,027, Fr. Pat. No. 2,407,232, Fr. Pat. No. 2,483,310, propose a treatment by plasma discharge in order to endow material having a base of silicone elastomers with wettability. In this case also, however, this treatment has proved ineffective after a time interval which is of variable duration but is always incompatible with the requisite length of service life of a product of this type.

There can also be mentioned U.S. Pat. No. 4,332,922 and European Pat. No. 0033754 which have the general object of increasing the oxygen permeability of contact lenses and propose to react a shaped and hardened silicone elastomer with a hydrogenosiloxane having 3 to 11 atoms of silicon so as to introduce SiH groups therein, then to act on these groups in order to convert them to hydroxylated Si-OH groups or to attach them by grafting various molecules which contain a double bond. Although allylglucose is mentioned in these patents incidentally and for the same reason as vinylpyrrolidone, it is clear that, in order to obtain satisfactory hydrophilicity or affinity for water, the grafted molecules are ethers or esters which have to undergo an additional operation of transesterification prior to a final plasma treatment. Apart from the manifest complexity of this process which involves multiple operating steps, it has the disadvantage of embrittling the surface layer of material and the problem of useful lifetime of lenses remains unsolved.

As a result of recent findings, investigators have been able to start with a better knowledge of the lacrimal film and of the natural conditions which prevail in the vicinity of the corneal epithelium, in particular after having demonstrated the key role which appears to be played by the mucin contained in the lacrimal liquid as it is adsorbed on microvillosities of the epithelium consisting of mucopolysaccharides which form an integral part of the cell membrane. Studies in this field have therefore been directed to the attachment of compounds of the sugar family to the surface of the material employed for contact lenses.

Consideration may be given here to the allylglucose mentioned in the patents cited earlier and above all in Pat. No. WO 83/03977, which makes use of a polysaccharide fixed by means of a silane carrying an epoxy group which serves as a coupling agent. Preliminary functionalization of a sugar, however, is a difficult operation which is not applicable to all sugars and coupling of a silane to the surface of the article presents awkward problems.

A comparison may also be made with U.S. Pat. No. 4,500,676 which proposes to coat different types of polymers with hyaluronic acid in the presence of a cross-linking agent and which, in the case of lenses having a silicone elastomer base, thus applies a solution of sodium hyaluronate but only after a preliminary treatment of the article with an aminated silane. In this case again, however, difficulties of a practical order are again encountered when endeavoring to obtain an optical-grade coating which is intended to endow the silicone material with durable wettability.

These difficulties are solved in accordance with the present invention by grafting saccharidic patterns on a silicone elastomer epoxidized. Thus the invention provides a wettable silicone elastomer as obtained by reticulating an epoxidized organopolysiloxane composition, and further comprising at its surface saccharidic compounds grafted on epoxy functions. In the mass, the proportion of epoxy functions in said composition is preferably from 0,05 to 15 milliequivalents per 100 gr. of the total composition weight. A preferred composition according to the invention comprises at least one organopolysiloxane component and one organohydrogenopolysiloxane component, wherein each of said components comprises at least either vinyl groups or SiH groups, or both, and at least one of said components comprises epoxy functions in a proportion from 0,05 to 15 milliequivalents per 100 gr. of the total weight of said composition. Surprisingly, it has been found that the desired objectives of wettability and persistence can thus be achieved without impairing the advantageous mechanical characteristics of silicones, without requiring the presence of mineral fillers which would be liable to affect the transparency of the material, and without being hindered, in the properties of the articles and even in operations which involve shaping by molding, by the properties of adhesion which are usually the essential reason for the presence of epoxidized silicones.

According to a preferred embodiment, the invention is directed to a silicone elastomer derived from cross-linking of an organopolysiloxane composition comprising:

an organopolysiloxane constituent (A) consisting of at least one diorganopolysiloxane oil containing at least two vinyldiorganosiloxy groups;

an organopolysiloxane constituent (B) consisting of at least one organopolysiloxane resin which is solid at room temperature and has units corresponding to the formulae $R_3SiO_{0.5}$ and $SiO_2$ in which R is selected from the methyl, ethyl, n-propyl, phenyl and vinyl radicals, said resin being such that on the one hand the molar ratio of units having the formula $R_3SiO_{0.5}$ to units having the formula $SiO_2$ is within the range of 0.5 to 1 and that on the other hand 1.5 to 10 moles % of silicon atoms have a vinyl radical which is directly attached to the silicon atom; preferably, the organopolysiloxane resin (b) additionally contains a unit corresponding to the formula $R_2RiO$ which is preferably present so as to ensure that there exist 1 to 10 mole % of units having the formula $R_2SiO$ with respect to the total number of moles of siloxane units which are present in compond (B);

a siloxane constituent (C) consisting of at least one organohydrogenopolysiloxane oil having epoxy functions with at least two SiH groups per molecule;

a constituent (D) consisting of a catalytically efficient quantity of catalyst having a metal base, said elastomer being provided at least at the surface with saccharidic compounds (E) grafted on epoxy functions.

Preferably, the composition in accordance with the invention is free of mineral fillers in order to guard against any reduction in transparency of the silicone elastomer. These mineral fillers are replaced by the solid organopolysiloxane resin (B) so as to ensure that the elastomer has good mechanical properties without in any way affecting its optical properties of transparency.

As a first particular feature of the invention, the diorganosiloxane oil (A) is blocked at each end of its chain by a vinyldiorganosiloxy unit, the organic radicals attached to the silicon atoms are selected therein from the methyl, ethyl, n-propyl and phenyl radicals and its viscosity is within the range of 100 to 300,000 mPa.s at 25° C.

As other particular features of the invention, the organohydrogenopolysiloxane oil (C) having an epoxy function has at least three SiH groups per molecule, the organic radicals attached to the silicon atoms are selected from the methyl, ethyl, n-propyl, phenyl and epoxy radicals and is employed in the composition in a quantity such as to have 0.5 to 2 moles of SiH group per mole of vinyl group derived from the constituents (A) and (B), and 0.05 to 15 milliequivalents epoxy functions per 100 g of the total weight of constituents.

Preferably, the organohydrogenopolysiloxane constituent (C) is derived from a liquid polymer ($C_1$) corresponding to the mean formula $R_xH_ySiO_{4-X-Y/2}$ in which X is a number from 1 to 1.99, Y is a number from 0.1 to 1 and preferably from 0.2 to 0.95, the sum $X+Y$ represents a number from 1.7 to 2.6 and preferably from 1.75 to 2.55, the definition of R being the same as that given by (C).

Particularly advantageous results are obtained with a liquid polymer ($C_1$) having a branched structure and units having the formula $(CH_3)_2HSiO_{0.5}$ and $SiO_2$ with a molar ratio M'/Q in the vicinity of 2, M' referred to $(CH_3)_2HSiO_{0.5}$ and Q referring to $SiO_2$.

The metallic compound of the catalyst (D) is preferably selected from the following metals: platinum, palladium, nickel, rhodium, ruthenium.

In regard to the saccharidic compounds to be grafted, considerable freedom of choice is allowed and all the sugars are suitable. It is readily possible to select those which correspond most effectively to the medium in which the manufactured articles are to be employed, for example in the case of contact lenses, those in which the molecule is close to the natural model of mucopolysaccharides of the corneal epithelium.

Consideration may thus be given to either monosaccharides or disaccharides or else to more or less complex polysaccharides which will be employed either alone or in a mixture.

The following may accordingly be mentioned:

monosaccharides: glucose, mannose, galactose, fructose and their derivatives such as glucosamine, galactosamine, glucosamine sulfate, N-acetylglucosamine, N-acetylgalactosamine, glucuronic acid, galacturonic acid, acetylneuraminic acid;

disaccharides: saccharose, maltose, cellobiose, lactose, chondrosine;

other polysaccharides: starch, alginic acid, hyaluronic acid, chondroitin

Among all these compounds, glucuronic acid is particularly advantageous.

The acid mucopolysaccharides are important constituents of cell linings and intercellular liquids.

Thus chondroitin which is encountered in the cornea consists of glucuronic acid and N-acetylgalactosamine chains. Similarly, hyaluronic acid which is wellknown in ophthalmologic surgery is formed by glucuronic acid and N-acetylglucosamine chains.

The present invention also relates to a process for the manufacture of articles such as contact lenses.

In order to fabricate these articles, the organopolysiloxane composition is cross-linked within a closed mold.

Shaping of the composition is readily carried out by molding whilst hardening by reaction of the SiH and vinyl groups is produced by a catalyst chosen from those indicated in the foregoing while heating at a moderate temperature if so required.

In this step of the process according to the invention, a mold of polyamide resin is preferably employed for shaping the composition. A point worthy of note is that a mold of this type is advantageously designed to correspond directly to the shape of the articles to be formed in order to avoid any need for machining operations on the elastomer. From this point of view, molds which are particularly wellsuited to fabrication of contact lenses comprise a convex mold, a concave mold and in some instances a special annular seal as described in European patent No. 0003695.

Silicone compositions containing at least three constituents of the siloxane type (A), (B) and (C) mentioned earlier but without any epoxy function are already known as described in particular in U.S. Pat. No. 3,284,406 and U.S. Pat. No. 3,436,366. Reference may usefully be made to the teachings of these patents. Other compositions containing an organopolysiloxane blocked at the end of the chain by vinyl groups and an organohydrogenopolysiloxane which carries epoxy functions are also described in U.S. Pat. No. 3,996,195 and U.S. Pat. No. 4,077,943 to which reference may also be made. In the second patent, the composition can also include a linear-chain organopolysiloxane carrying at least one vinyl group per molecule which is directly attached to a silicon atom, preferably but not necessarily at the end of the chain. In both cases, however, consideration is given to bonding compositions and the proportion of epoxy functions is higher than that recommended in the field of application of the present invention.

It has in fact been found in accordance with the present invention that, in a surprising and unexpected manner, relatively low proportions of epoxy functions permit easy shaping by molding whereas they nevertheless remain sufficient to endow the material obtained with a satisfactory degree of affinity for water which makes it substantially biocompatible and highly useful in the field of contact lenses.

The molded contact lenses thus formed of silicone elastomer in accordance with the invention are then placed in an aqueous solution of at least one of the saccharidic compounds mentioned earlier in a proportion within the range of 5 to 50 % by weight. Said lenses are continuously immersed in this solution over a period, for example, of 1 to 5 hours at a temperature of the order of 60° to 90° C., in accordance with a procedure described by Sundberg and Porath (J. Chromatogr. 90 87-1974).

This accordingly has the effect of grafting saccharidic compounds on the epoxy groups of the silicone elastomer.

It is particularly worthy of note that, whereas the authors of the patents cited earlier describe a mode of grafting in a basic medium in the case of glucuronic acid, it is necessary on the contrary to operate in an acid medium at a pH value within the range of 3 to 4 in order to obtain the best result.

On completion of this grafting operation, the lenses of silicone elastomer are washed in distilled water at the boiling point and are then immersed in a solution of isotonic physiological salt solution in order to make them wettable and thus to permit their use as contact lenses.

In the description and examples given hereinafter as well as in the foregoing, the fractions and percentages indicated are expressed by weight unless otherwise indicated.

In these examples, diorganopolysiloxane oil (A) having a viscosity within the range of 100 to 300,000 mPa.s at 25° C. and preferably within the range of 600 to 200,000 mPa.s at 25° C. is a linear polymer formed by a series of diorganosiloxy groups blocked at the end of the chain by a vinyl diorganosiloxy unit. The organic radicals attached to the silicon atoms of the polymer are selected from the methyl, ethyl, n-propyl, phenyl, trifluoro-3,3,3-propyl radicals. Preferably, at least 90 mole % of these radicals are methyl radicals and a maximum of 10 mole are phenyl radicals.

By way of concrete examples of diorganosiloxy groups, those of the following formulae may be mentioned : $(CH_3)_2SiO$, $CH_3(C_6H_5)SiO$, $(C_6H_5)_2SiO$, or $CH_3(n.C_3H_7)SiO$, $CH_3(C_6H_5)SiO$, Preference is given to the use of a dimethylpolysiloxane oil blocked at each end of its chain by a dimethylvinylsiloxy unit or a methylphenylvinylsiloxy unit having a viscosity within the range of 300 to 150,000 mPa.s at 25° C.

The vinyl oil (A) defined in the foregoing is marketed by manufacturers of silicones. Moreover, manufacture of this oil may be carried out for example by polycondensing and rearranging in the presence of a catalyst the product of hydrolysis of a mixture consisting of a diorganovinylchlorosilane and a diorganodichlorosilane. Said vinyl oil may also be produced by polymerization of a diorganocyclopolysiloxane such as octamethylcyclotetrasiloxane by means of an alkaline or acid catalyst in the presence of a suitable quantity of a chain-blocking agent such as that which corresponds to the formula : $R(CH_2=CH)CH_3SiO [Si(CH_3)_2O]_n SiCH_3(CH=CH_2)R$ where R is a methyl or phenyl radical and n is any number from 0 to 20.

When equilibrium of the polymerization reaction has been attained, the catalyst is neutralized and the volatile constituents are removed by distillation.

The oil (A) can be employed either alone or in the form of a mixture of oils (A) which differ from each other in the value of their viscosity. Whenever the compositions are prepared in the form of two components, it is also possible to introduce an oil having relatively low viscosity (for example 300 to 20,000 mPa.s at 25° C.) into one of the two components and to introduce another oil having higher viscosity (for example 60,000 to 150,000 mPa.s at 25° C.) into the other component. This process permits suitable adjustment of viscosity of the two components.

Resinous copolymers which can be employed as siloxane constituents (B) within the scope of the present invention are described in detail in U.S. Pats. No. 2,486,162, 3,284,406 and 3,436,366, the contents of which will serve here as a reference. These copolymers are also marketed by silicone manufacturers.

The compositions in accordance with the invention preferably contain 5 to 70 parts by weight of resin (B) in respect of 100 parts by weight of polymer (A).

In regard to the organohydrogenopolysiloxane constituent (C) having an epoxy function, this constituent may be prepared beforehand by partial hydrosilylation reaction between a non epoxidized corresponding organohydrogenopolysiloxane ($C_1$) and an organic or organosilicon compound ($C_2$) having an ethylene unsaturation and at least one epoxy group in the presence of a catalyst based on a metal of the platinum group similar to (D) or of an organic peroxide or else ultraviolet light as described, for example, in French patent No. FR-1-1,185,009.

The organohydrogenopolysiloxane ($C_1$) then advantageously constitutes at least three SiH groups per molecule which will be partially replaced by the radicals carrying epoxy functions. The organohydrogenosiloxane ($C_1$) corresponding to the definition given above can be a homopolymer, a copolymer or their mixtures, containing polysiloxane patterns having the following formulae :
$RSiO_{1.5}$, $R_2SiO$, $R_3SiO_{0.5}$, $SiO_2$, or
$RHSiO$, $HSiO_{1.5}$, $RHSiO_{0.5}$
in which the organic radical R has the meaning given to the compound (C) above.

Thus the product ($C_1$) can be an organohydrogenopolysiloxane liquid polymer having at least three SiH groups per molecule. This polymer corresponds to the mean formula $R_X H_Y SiO_{4-X-Y/2}$ in which X is a number from 1 to 1.99 and preferably from 1.05 to 1.95 and in which Y is a number from 0.1 to 1 and preferably 0.2 to 0.95, in which the sum X+Y represents a number from 1.7 to 2.6 and preferably from 1.75 to 2.55, and in which R represents a methyl, ethyl, n-propyl, phenyl radical, preferably at least 80 % of the radicals R being methyl radicals. The formula given above includes the polymers (C$_1$) which have a linear, cyclic or branched structure.

A polymer (C$_1$) of linear structure can correspond to the mean formula:

R$_{(3-t)}$H$_t$Si[OSiR$_2$]$_g$[OSiRH]$_n$OSiH$_t$R$_{(3-t)}$ in which t is the number 0 or 1, g is a number from 0 to 50, h is a number from 3 to 90 and R has the same meaning as that given above in the case of the product (C$_1$).

Preference is given to the use of a polymer having a linear structure and corresponding to the mean formula:

(CH$_3$)$_3$Si[OSi(CH$_3$)$_2$]$_g$[OSi(CH$_3$)H]$_h$OSi(CH$_3$)$_3$ in which g and h have the meanings given earlier.

A polymer (C$_1$) of cyclic structure can correspond to the mean formula:

[OSiRH]$_{n1}$[OSiR$_2$]$_{n2}$, in which n1 is a number from 3 to 10, n2 is a number from 0 to 5 and R has the same meaning as that given earlier.

Preferably, a polymer (C$_1$) of cyclic structure corresponds to the formula [OSi(CH$_3$)H]$_4$ or to the formula [OSi(CH$_3$)H]$_3$.

A polymer (C$_1$) of branched structure advantageously includes at least one unit having the formulae RSiO$_{1.5}$, SiO$_2$, HSiO$_{1.5}$, the other units being selected from the same group as those having the following formulae:

R$_3$SiO$_{0.5}$, HR$_2$SiO$_{0.5}$, R$_2$SiO, H(R)SiO in which R again has the same meaning as that given earlier.

A polymer having a well-determined branched structure can correspond to the mean formula:

P$_W$Si[OSiR$_2$H]$_{W'}$[(OSiR$_3$)$_{W''}$]$_{4-W}$ in which:
R' represents R or H (R always has the same meaning),
W is the number 0 or 1, W' is the number 2, 3 or 4, W'' is the number 0 or 1, W' + W'' represents the number 3 or 4,
with the reservation that:
when W is zero, W' is the number 3 or 4,
when W is 1 and R' represents H, W' is the number 2 or 3,
when W is 1 and R' represents R, W' is the number 3.

There is preferably chosen as product (C$_1$) a polymer having a branched structure and units corresponding to the formula (CH$_3$)$_2$HSiO$_{0.5}$ and SiO$_2$ in a molar ratio M'/Q in the vicinity of 2, the preparation of which is described in U.S. Pat. No. 2,915,497.

Further examples of organohydrogenopolysiloxanes (C$_1$) which are suitable for use in the compositions in accordance with the present invention are also described in U.S. Pats. No. 3,284,406 and No. 3,436,366 cited earlier by way of reference.

The epoxidized compounds (C$_2$) having ethylene unsaturation are well-known to those versed in the art.

Essentially for reasons of ease of supply, preference is given to the use of compounds (C$_2$) corresponding to the following formulae:

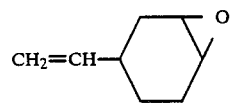

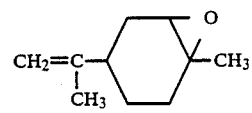

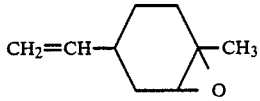

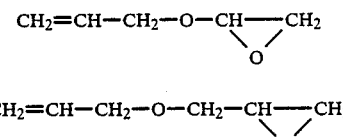

Epoxidized organohydrogenopolysiloxanes (C) and the method of preparation of these latter are already described in U.S. Pat. No. 3,996,195, U.S. Pat. No. 4,077,943, French Pat. No. 1,345,921, German Pat. No 1,272,550 and French Pat. No. 2,526,800 already cited by way of reference.

It will be noted that compositions in accordance with the invention can contain a constituent (C) which is both an epoxidized organohydrogenopolysiloxane and an organohydrogenopolysiloxane of type (C$_1$) without an epoxy function, the entire constituent (C) being present in the composition in a quantity such as to have 0.5 to 2 moles, preferably 1 to 1.5 moles of SiH groups per mole of vinyl group derived from the compounds (A) and (B), and the epoxidized portion being present in a proportion of 0.05 to 15 milliequivalents, preferably 0.1 to 6 milliequivalents of epoxy functions in respect of 100 g of (A)+(B)+(C).

The metal of the catalyst constituent (D) is preferably platinum.

A platinum catalyst (D) of this type is usually introduced so as to provide from 1 to 500 ppm (parts per million), preferably from 5 to 80 ppm of platinum expressed in metal with respect to the vinyl oil (A).

There is preferably employed an unsupported catalyst selected from chloroplatinic acid, its hexahydrated form, its alkali-metal salts, its complexes with organic derivatives.

Particularly recommended are the reaction products of chloroplatinic acid with vinylpolysiloxanes such as divinyl-1,3-tetramethyldisiloxane which may or may not be treated with an alkaline agent for partly or totally eliminating the chlorine atoms (U.S. Pats. No 3,419,593, No. 3,775,452 and No. 3,814,730). Also recommended are the reaction products of chloroplatinic acid with alcohols, ethers, aldehydes (U.S. Pat. No. 3,220,972).

Other efficient catalysts include the platinum chelates and the complexes of platinum dichloride with phosphines, phosphine oxides, olefins such as ethylene, propylene, styrene (U.S. Pats. No. 3,159,610 and No. 3,552,327).

The preparation of the compositions in accordance with the invention can take place simply by mixing the various constituents (A), (B), (C), (D) in any order of introduction by means of suitable equipment units. It is desirable as a last step, however, to add the catalyst to the platinum (D) or the organohydrogenopolysiloxane having epoxy functions (C).

The compositions thus formed are capable of hardening as soon as ambient temperature is reached or by heating to a temperature between ambient (room) temperature and 200° C. during a period within the range of 2 to 30 minutes.

In the case of certain compositions which harden immediately at ambient (room) temperature, it may prove useful to stabilize them and to condition them in the form of single-component compositions having a "pot lifetime" in excess of one day. This can be obtained by adding an inhibitor to the platinum catalyst (D). Inhibitors of this type are well-known and include in particular the amines, the silazanes, the oximes, the diesters of carboxylic diacids, the acetylene alcohols, the acetylene ketones, the vinymethylcyclopolysiloxanes (U.S. Pats. No. 3,445,420 and No. 3,989,667). The inhibitor is advantageously employed in a proportion of 0.005 to 5 parts and preferably 0.01 to 3 parts per 100 parts of the vinyl oil (A).

The compositions containing an inhibitor can be stable over a period of several days at ambient temperature. In order to obtain the elastomers at the desired moment, the compositions are heated to a temperature above 60° C. and preferably above 100° C. However, this mode of operation is exacting in its requirements. In the majority of instances, the compositions in accordance with the invention are therefore conditioned in the form of two or three components. The inhibitor is either not provided or else added in a small dose for the purpose of adjusting the hardening time.

One of the components can be constituted for example by a fraction of the vinyl oils (A), of the resin (B), of the entire quantity of catalyst (D). The other component is accordingly constituted by the remaining fraction of the vinyl oils (A) and of the entire quantity of hydrogenoorganopolysiloxane having an epoxy function (C).

The quantities employed for the various constituents and the viscosity of the polymers can be modified in different ways for the preparation of two components, the viscosities of which are not very high and have values, for example, which do not exceed 20,000 mPa.s at 25° C., with the result that they can readily be mixed at the moment of molding. It is a recommended practice, however, to place the entire quantity of platinum catalyst (D) in one of the components and to put the entire quantity of organohydrogenopolysiloxane polymer having an epoxy function (C) in the other component.

The examples given hereinafter without any limitation being implied illustrate the constitution, preparation and use of compositions in accordance with the invention for the manufacture of contact lenses.

EXAMPLE 1

A composition of silicon resin is prepared in two fractions 1 and 2.

Preparation of fraction 1

There were mixed in a mixer :

60 parts of vinyl oil (A$_1$) of the type consisting of dimethylpolysiloxane blocked at each end by a vinyldimethylsiloxy unit, having a viscosity of 600 mPa.s at 25° C. ;

40 parts of dry excipients of a vinyl resin (B$_1$) made up of 53.5 mole % of SiO$_2$ units, 6 mole % of (CH$_3$)(CH$_2$=CH)SiO units and 40 mole % of (CH$_3$)$_3$SiO$_{0.5}$ units;

20 parts (calculated in platinum metal) per million parts of vinyl oil (A$_1$) of a catalytic solution (D$_1$) prepared by mixing at ambient temperature 0.6 part of chloroplatinic acid, 10 parts of isopropanol, 55 parts of xylene and 6 parts of tetramethyl-1,1,3,3-divinyl1,3-disiloxane.

Preparation of fraction 2

There were mixed in a mixer :

4.05 parts of a hydrogenated liquid silicone resin (C$_1$) prepared by hydrolysis of technical silicate Si(OC$_2$H$_5$)$_4$ and (CH$_3$)$_2$HSiCl in quantities corresponding to 1 mole of SiO$_2$ in respect of 2 moles of (CH$_3$)$_2$HSiCl in solution in toluene. This resin therefore had a theoretical molar ratio of units (CH$_3$)HSiOH$_{0.5}$/SiO$_2$=2 and a real molar ratio of 2.23.

0.8 part of a polymer having the formula :

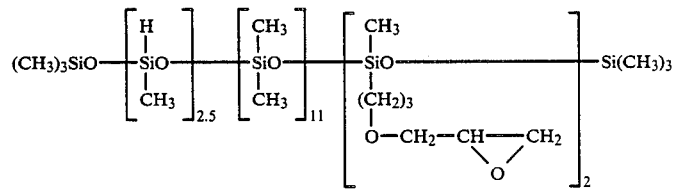

The composition has a ratio SiH/SiVi of 1.17 and an epoxy content of 1.12 meq in respect of 100 g of composition (where Vi designates the vinyl radical).

Fractions 1 and 2 were mixed and cross-linking started as soon as ambient temperature was reached.

After molding, cross-linking was completed by heat treatment in a ventilated oven over a period of four hours at 60° C. followed by two hours at 100° C.

The Shore A hardness number (SAH) was 45, the linear shrinkage (LS) was approximately 0.1 %, the ultimate tensile strength (UTS) was 0.5 MPa (Standard NF-T-4600Z), elongation at fracture (E/F) was 100 % (Standard NF-T-4600Z), the tear strength (TS) was 1.5 le k N/m.

EXAMPLE 2

The silicon composition was prepared in two 1 and 2.

Preparation of fraction 1

There were mixed in a mixer :
68 parts of the vinyl oil (A$_1$) of Example 1,
32 parts of the vinyl resin (B$_1$) of Example 1,
20 ppm of the catalyst solution (D$_1$) with respect to (A$_1$)

Preparation of fraction 2

There were mixed in a mixer :
6 parts of a hydrogenated and epoxidized liquid silicone resin (C$_3$) obtained by hydrosilylation of allylglycidylether by the resin (C$_1$) of Example 1 and containing 97.6 meq. of epoxy functions and 732 meq. of SiH functions per 100 g of (C$_3$)

The composition had a SiH/SiVi ratio of 1.18 and an epoxy function content of 5.52 meq. in respect of 100 g of $(A_1)+(B_1)+(C_3)$.

The process was carried out exactly as in Example 1. The mechanical properties obtained were as follows:
SAH : 41
UTS : 1.20 MPa
E/F : 94 %

EXAMPLE 3

The mode of operation of Example 2 was repeated except for the fact that the quantity of $(C_3$ was a varied whilst the fraction 1 remained unchanged. The results obtained are recorded hereunder in the event that 6.4 parts of $(C_3)$ are employed :
SiH/SiVi : 1.26
Epoxy : 5.9 meq. in respect of 100 g $(A_1)+(B_1)+(C_3)$
SAH : 48
UTS : 0.34 MPa
E/F : 76 %

EXAMPLE 4

The procedure was the same as in Example 3 but with 5 parts of $(C_3)$. The following results were obtained :
SiH/SiVi : 1.0
Epoxy : 4.9 meq. in respect of 100 g $(A_1)+(B_1)+(C_3)$
SAH : 33
UTS : 0.66 MPa
E/F : 118 %

EXAMPLE 5

The mode of operation of Example 2 was repeated. Fraction 1 remained unchanged and fraction consisted of 5 parts of a hydrogenated and epoxidized liquid silicone resin $(C_4)$ obtained by hydrosilylation of allylglycidylether by the resin $(C_1)$ of Example 1 and containing 48 meq. of epoxy functions and 847 meq. of SiH functions in respect of 100 g of $(C_3)$.

The composition had a SiH/SiVi ratio of 1.2 and an epoxy function content of 2.4 meq. in respect of 100 g of $(A_1)+(B_1)+(C_4)$ The mechanical properties obtained were as follows :
SAH : 38
UTS : 0.61 MPa
E/F : 94 %

EXAMPLE 6

A silicone composition prepared in accordance with Example 1 was introduced into molds of polyamide resin of the type known by the trade name Rilsan and having the shape of contact lenses.

The composition was polymerized by placing in an oven over a period of four hours at 60° C. followed by a period of two hours at 100° C.

The lenses thus obtained were removed from the molds.

The non-polymerized portions of said lenses were extracted by means of methylene chloride.

The lenses were immersed in a 10 % solution of glucuronic acid in water, the acid pH of the solution being between 3 and 4.

The aggregate was heated to 80° C. over a period of two hours.

The lenses were then washed with water at the boiling point during a period of approximately fifteen minutes.

The lenses were finally immersed in an isotonic physiological salt solution in order to make them wettable at the surface by the lacrimal fluid.

The quantity of sugar grafted on the silicone elastomer was undetectable by conventional methods of analysis. It may be estimated, however, at $10^{-6}$ to $10^{-8}$ moles per lens. After hydration in the isotonic salt solution, this is sufficient to make the lens perfectly wettable on the eye.

The mechanical and optical properties of the silicone elastomer remained unchanged after the grafting reaction. Similarly, no significant reduction of permeability was observed.

The lenses may be worn daily for several months without any alteration of their properties and in particular without any loss of wettability.

EXAMPLE 7

Results identical with those of Example 6 were obtained by proceeding in like manner from silicone compositions prepared in accordance with each of the Examples 2 to 5.

We claim:

1. A wettable organic material comprising: a cross-linked silicon elastomer which comprises at least one orgtaniopolysiloxane component having vinyl groups and at least one organohydrogenopolysiloxane component having SiH groups, wherein at least one of said components has epoxy functions on the surface of said elastomer, in an amount effective to produce surface wettability.

2. An organic material according to claim 1 in which the epoxy functions are present in a proportion of from 0.05 to 15 milliequivalents per 100 grams of said elastomer.

3. A silicone composition comprising at least two cross-linkable siloxane components, in which a first component is an organopolysiloxane having vinyl groups, a second component is an organohydrogenopolysiloxane having SiH groups, and at least one of said first and second components has epoxy functions in a proportion of from 0.05 to 15 milliequivalents per 100 grams of said composition.

4. A cross-linked silicone elastomer which comprises the siloxane components of claim 3.

5. A cross-linked silicone elastomer comprising
   (A) a diorganopolysiloxane oil having at least 2 vinyl diorganosiloxy groups,
   (B) an organopolysiloxane resin solid at room temperature, having structural units corresponding to the formula $R_3SiO_{0.5}$, in which R is selected from the group consisting of methyl, ethyl, n-propyl, phenyl and vinyl, and $SiO_2$, the ratio of $R_3SiO_{0.5}$ units to $SiO_2$ units being from 0.5 to 1, and in which from 1.5 to 10 mole % of the silicon atoms are directly attached to a vinyl radical,
   (C) an organohydrogenopolysiloxane oil having epoxy functions in a proportion of from 0.05 to 15 milliequivalents per 100 grams of the elastomer and at least 2 SiH groups per molecule, and
   (D) a catalytic quantity of a metal selected from the group consisting of platinum, palladium, nickel, rhodium and ruthenium.

6. A wettable organic material which comprises: a cross-linked elastomer comprising
   (A) a diorganopolysiloxane oil having at least 2 vinyl diorganosiloxy groups, (B) an organopolysiloxane resin solid at room temperature, having structural units corresponding to the formula $R_3SiO_{0.5}$, in which R is selected from the group consisting of methyl, ethyl, n-propyl, phenyl and vinyl, and $SiO_2$, the ratio of $R_3SiO_{0.5}$ units to $SiO_2$ units being from 0.5 to 1, and in which from 1.5 to 10 mole % of the silicon atoms are directly attached to a vinyl radical.

(C) an organohydrogenopolysiloxane oil having epoxy functions in a proportion of from 0.05 to 15 milliequivalents per 100 grams of the elastomer and at least 2 SiH groups per molecule, and (D) a catalytic quantity of a metal selected from the group consisting of platinum, palladium, nickel, rhodium and ruthenium; and (E) a saccharidic compound grafted on the epoxy functions on the surface of said elastomer.

7. A wettable organic material according to claim 6, wherein the diorganopolysiloxane oil (A) is blocked at each end of its chain by a vinyl diorganosiloxy unit, the organic radicals attached to the silicon atoms are selected from the group consisting of methyl, ethyl, n-propyl and phenyl, and the viscosity of said diorganosiloxane oil is within range of 100 to 300,000 mPa.s at 25° C.

8. A wettable organic material according to claim 6, wherein the organopolysiloxane resin (B) additionally contains units corresponding to the formula $R_2SiO$ in sufficient amount to ensure the presence of from 1 to 10 mole % of said units with respect to the number of moles of siloxane units present in said resin.

9. A wettable organic material according to claim 6, wherein in the organohydrogenopolysiloxane oil (C), the organic radicals attached to the silicon atoms which are not epoxy radicals are radicals from selected from the group consisting of methyl, ethyl, n-propyl and phenyl, and where said oil is present in sufficient amount so as to provide from 0.5 to 2 moles of SiH group per mole of vinyl group derived from constituents (A) and (B).

10. A wettable organic material according to claim 6, wherein the organohydrogenopolysiloxane oil (C) is derived from a liquid polymer corresponding to the mean formula $R_xH_ySiO_{4-X-Y-Z/2}$ in which X is a number from 1 to 1.99, Y is a number from 0.1 to 1, the sum of X=Y represents a number from 1.7 to 2.6 and R is selected from the groups consisting of methyl, ethyl, n-propyl, phenyl and epoxy.

11. A wettable organic material according to claim 10 in which, in the mean formula of the liquid polymer, Y is a number from 0.2 to 0.95, and the sum of X=Y represents a number from 1.75 to 2.55.

12. A wettable organic material according to claim 10 in which the liquid polymer ($C_1$) is a polymer having a branched structure and units corresponding to the formulae $(CH_3)_2SiO_{0.5}$ and $SiO_2$ in a molar ratio of about 2.

13. A wettable organic material according to claim 6 in which the saccharidic compound is selected from the group consisting of glucose, mannose, galactose, fructose, glucosamine, galactosamine, glucosamine sulfate N-acetylglucosamine, N-acetylgalactosamine, glucuronic acid, galacturonic acid, acetylneuraminic acid, saccharose, maltose, cellobiose, lactose, chondrosine, starch, alginic acid, hyaluronic acid, chondroitin, and mixtures thereof.

14. A method for manufacturing a wettable article which comprises the steps of
curing within a closed mold
a silicon composition comprising at least two cross-linkable siloxane components, in which a first component is an organopolysiloxane having vinyl groups, and a second component is an organohydrogenopolysiloxane having SiH groups, at least one of said first and second components having epoxy functions in a proportion of from 0.05 to 15 milliequivalents per 100 of said composition,
with a catalytically effective amount of a metallic catalyst, to obtain a cross-linked elastomer, and
contacting said elastomer with a saccharidic compound,
thereby obtaining a wettable article in which saccharidic groups are grafted onto the epoxy functions on the surface of said silicone composition.

15. A method according to claim 14 wherein the silicone composition comprises (A) a diorganopolysiloxance oil having at least 2 vinyl diorganosiloxy groups, (b) an organopolysiloxane resin solid at room temperature, having structural units corresponding to the formula $R_3SiO_{0.5}$, in which R is selected from the group consisting of methyl, ethyl, n-propyl, phenyl and vinyl, and $SiO_2$, the ratio of $R_3SiO_{0.5}$ units to $SiO_2$ units being from 0.5 to 1, and in which from 1.5 to 10 mole % of the silicon atoms are directly attached to a vinyl radical, (C) an organohydrogenopolysiloxane oil having epoxy functions in a proportion of from 0.05 to 15 milliequivalents per 100 grams of the elastomer and at least 2 SiH groups per molecule, and the catalyst is selected from the groups consisting platinum, palladium, nickel, rhodium and ruthenium.

16. A method according to claim 15 in which the cross-linked elastomer is immersed in an aqueous solution of the saccharidic compound.

17. A method according to claim 16 in which the saccharidic compound is glucuronic acid, and the pH of the solution is between 3 and 4.

18. A method for manufacturing a wetted article in which the wettable article of claim 14 is immersed in an isotonic physiological salt solution.

* * * * *

UNITED STATES PATENT AND TRADEMARK OFFICE
CERTIFICATE OF CORRECTION

PATENT NO. : 4,940,751
DATED : July 10, 1990
INVENTOR(S) : Jean-Marc Frances, et al.

It is certified that error appears in the above-identified patent and that said Letters Patent is hereby corrected as shown below:

In Col. 10, line 54, for "two 1 and 2" read --two fractions 1 and 2--.

In Col. 11, line 12, for" ($C_3$ was a varied" read --($C_3$) was varied--.

In Col. 12, line 27, for "orgtaniopolysiloxane" read --organopolysiloxane--.

In Col. 12, line 30, Claim 1, after "functions" insert --; and a saccharidic compound grafted onto the epoxy functions--.

In Col. 13, line 47, Claim 10 and line 52, Claim 11, for "X=Y" read --X+Y--.

Signed and Sealed this

Ninth Day of February, 1993

Attest:

STEPHEN G. KUNIN

Attesting Officer

Acting Commissioner of Patents and Trademarks